United States Patent Office 3,441,344
Patented Apr. 29, 1969

3,441,344
CAMERA RELEASE PARTICULARLY FOR MOTION PICTURE
Heinz Kuppenbender, Heidenheim (Brenz), and Roland Hochstein, Stuttgart-Mohringen, Germany, assignors to Zeiss-Ikon Aktiengesellschaft, Stuttgart, Germany, a corporation of Germany
Filed Feb. 28, 1966, Ser. No. 530,425
Claims priority, application Germany, Mar. 6, 1965, Z 11,387
Int. Cl. G03b 19/18
U.S. Cl. 352—169           5 Claims

ABSTRACT OF THE DISCLOSURE

A photographic camera is provided with an axially movable annular release button in the bore of which is mounted an independently axially depressible switch control member which projects from the annular release button for a disconnectible automatic exposure adjusting device.

---

The present invention relates to a release for cameras particularly for motion-picture cameras.

The United States Letters Patent No. 3,186,319, issued on June 1, 1965, discloses a release for cameras, particularly for motion-picture cameras, which is equipped with a disconnectible automatically operating exposure adjusting device, whose circuit make and break contacts or control switch can be actuated independently of the camera release button and in which the actuating members for the control switch and for the release are combined in a single manipulating unit, thus eliminating additional control buttons or levers that otherwise would be necessary.

It is also disclosed in the aforementioned Letters Patent that the control switch for rendering active the automaitc exposure setting means and the camera release are combined in such a manner that it is practically impossible to forget the employment of the automatic exposure setting means whenever such a step is essential.

The object of the present invention is to provide new, improved and simplified manipulation units for camera release and switch for automatic exposure setting.

In one embodiment of this invention, the manipulation unit consists of an annular camera release button and a push button slidably arranged inside the annulus and serving as actuator for the switch of the automatic exposure setting means. The annular button carries a bow-shaped yoke pivotally mounted at diametrically opposite points of its periphery and able to swing through about 90 degrees from one end position, lying halfway around the periphery of the release button and giving the push button free, into the other end position, pointing upwardly and forming a bridge across the push button. It is advisable to locate the stop for limiting yoke movement at its upright position somewhat beyond 90 degrees so that incidental flap-back of the yoke cannot occur when pressing for camera release.

In a different form of the invention, the simplified single manipulation unit consists again of an annular camera release button and an automatic-exposure-controlling push button slidably arranged inside the annulus, but in this case eccentrically located therein so that the annulus is considerably wider on one side of the push button to serve as a finger rest for separate and independent actuation of the release button, whereby the wider portion may be provided with a suitable depression to accentuate the finger rest.

Two preferred embodiments of the invention will now be described in greater detail to an extent essential for a complete understanding thereof, but details being non-essential are omitted for clearness.

Figure 1:
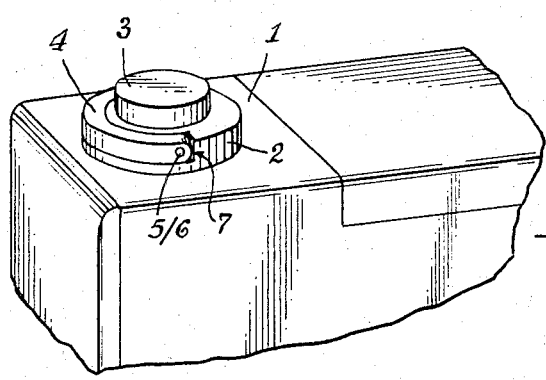
FIG. 1 is a perspective view of a camera portion showing the manipulation unit according to the invention with the bow-shaped yoke of the release button in flapped-back position clearing the push button.
Figure 2:
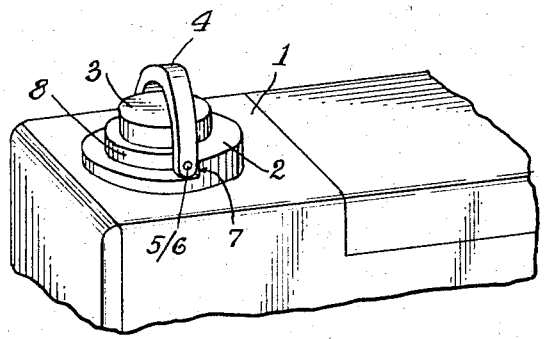
FIG. 2 is a similar perspective view with the bow-shaped yoke in upright position bridging the push button.

With reference to FIGS. 1 and 2, mounted in the top wall of a camera housing 1 is an annular depressible release button 2 through whose center opening projects a push button 3 serving to actuate the switch of the automatic exposure adjustment device. A suitable semicircular recess extends substantially halfway around the periphery and the upper face of the release button 2 to accommodate a bow-shaped yoke 4 which is pivotally mounted at both ends by pivot pins 5, 6 secured in a collar portion 8 formed inside the recess of release button 2. A stop shoulder 7 at each end of the recess limits the swinging movement of the yoke 4 when it reaches its substantially upright end position, which is the position into that the yoke 4 is moved for operating the camera without automatic exposure setting. The height of collar portion 8 is approximately equal to the width of yoke 4 so that the upper surface of the release button is flush when the yoke is flapped downwardly into its horizontal position.

In operation, when intending to utilize automatic exposure setting, the yoke 4 is swung downwardly into the semi-circular recess of the release button 2. When now depressing the push button 3, first the automatic exposure adjusting device will be rendered operative, and then, when continuing pressing, both buttons 2 and 3 will move together and camera release will be operated.

In the special case, in which the automatic exposure adjusting device is not to be operated, it is only necessary to swing the yoke 4 on the release button 2 into its upright position. Then it is disposed above and across the push button 3. The pressure for operating the camera release device will now be exerted against the top of yoke 4 and solely the button 2 is depressed but not the centrally located push button 3 on account of the sufficient clearance provided between it and the yoke. Thus the automatic exposure setting means will not be rendered effective.

Figure 3:
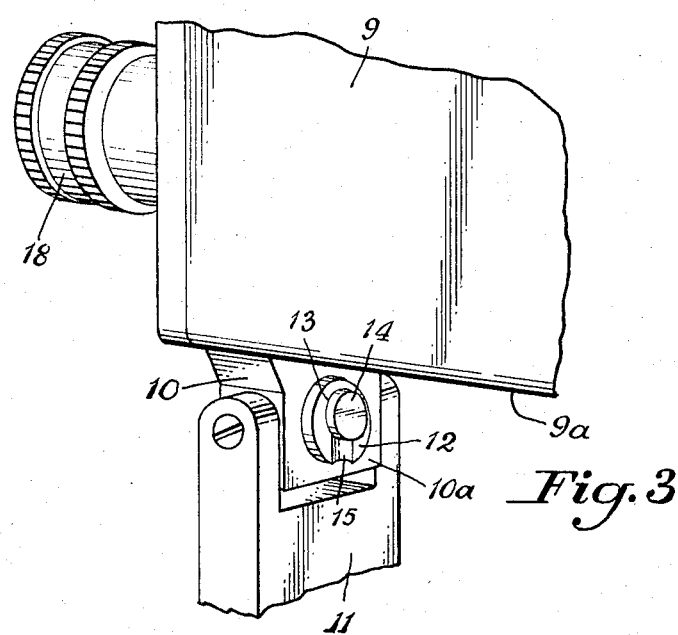
FIG. 3 is a perspective view of a camera portion equipped with the different form of the invention in which the push button is eccentrically located inside the annular camera release button.

The modified construction illustrated in FIG. 3 does not have a yoke or an equivalent thereof. The motion-picture camera housing 9 is provided on its bottom face 9a with a downwardly extending bearing projection 10 for securing thereon a downwardly projecting handle 11. The projection 10 has mounted on its vertical rear face 10a the camera release button 12. The camera objective is indicated 18. This release button 12 is provided with an eccentric bore 13 for mounting therein a push button 14 for actuating the control switch of the automatically operating exposure adjusting means. The eccentric arrangement of the push button 14 in the eccentric bore of the release button 12 leaves a lower wide rim portion for engaging the release button 12 and facilitate separate and independent actuation of the two buttons 12 and 14 respectively. It is advisable, but not necessary, to provide the wider rim portion with a concave depression 15 to indicate and make easily noticeable finger rest for actuation of the camera release.

In the modification of the invention just described, no special mechanism nor preparatory adjustment is required in case it is desired to work without the automatic exposure adjustment means. It is only necessary that the camera user mindfully avoids an actuation or depression of push button 14 and solely depresses the release button 12.

In general, for all exposures utilizing the automatic exposure adjustment means, both buttons 12 and 14 are depressed simultaneously.

With both embodiments of the camera manipulating units described, it is, of course, possible to study the light conditions for a prospective film exposure by depressing solely the push button 3 or 14 respectively and rendering the respective automatic exposure setting means effective for observation. Then, if the lighting of the subject to be photographed is found unfavorable, the idea of taking the pictures can still be abandoned and waste of valuable film material avoided.

What we claim is:

1. The combination comprising a manually operable camera release device and a manually operable switch control member for a disconnectible exposure adjusting device, said camera release device including a manually depressible annular camera release member, and said manually operable switch control member comprising a separately manually depressible button disposed independently movable within said camera release member, and a substantially semi-circular yoke member pivotally mounted with its ends to said annular camera release member and adapted to be moved from a substantially vertical position in which the latter extends freely above said switch control button and prevents its actuation into a horizontal position in which it permits the actuation of said switch control button and selectively also permits the actuation of said camera release member.

2. The combination according to claim 1, in which said annular camera release member is provided with a semi-annular recess for receiving said semi-circular yoke member when the latter is pivotally moved from a substantially vertical position into a horizontal position.

3. The combination according to claim 1, in which the movement of said semi-circular yoke member from one of its two positions into the other takes place within an angle in excess of 90°.

4. The combination according to claim 1, in which said switch control button is disposed within an eccentric bore of said annular camera release member, the wider portion on said release member formed by said eccentricity serving as a finger engagement portion for facilitating the actuation of said release member.

5. The combination according to claim 1, in which said switch control button is disposed within an eccentric bore of said annular camera release member, the wider portion on said release member formed by said eccentricity being provided with a concave surface area serving as a finger engagement portion for facilitating the actuation of said release member.

References Cited

UNITED STATES PATENTS

| | | | |
|---|---|---|---|
| 3,106,126 | 10/1963 | Kirk | 352—169 |
| 3,186,319 | 6/1965 | Hochstein. | |
| 3,238,008 | 3/1966 | Krumbein et al. | |

JULIA E. COINER, *Primary Examiner.*

U.S. Cl. X.R.

352—165, 178